(12) United States Patent
Zhang et al.

(10) Patent No.: US 10,227,461 B2
(45) Date of Patent: Mar. 12, 2019

(54) FIBER REINFORCED THERMOPLASTIC COMPOSITES AND METHODS OF MAKING

(71) Applicant: JOHNS MANVILLE, Denver, CO (US)

(72) Inventors: Mingfu Zhang, Highlands Ranch, CO (US); Asheber Yohannes, Littleton, CO (US); Michael J Block, Centennial, CO (US); Klaus Friedrich Gleich, Nuremberg (DE); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 15/403,261

(22) Filed: Jan. 11, 2017

(65) Prior Publication Data

US 2017/0121474 A1 May 4, 2017

Related U.S. Application Data

(62) Division of application No. 14/172,942, filed on Feb. 5, 2014, now Pat. No. 9,574,056.

(51) Int. Cl.

| | |
|---|---|
| *C08J 5/06* | (2006.01) |
| *C08K 9/04* | (2006.01) |
| *C08K 7/02* | (2006.01) |
| *B05D 1/02* | (2006.01) |
| *B29C 45/00* | (2006.01) |
| *B29C 45/02* | (2006.01) |
| *B29C 47/00* | (2006.01) |
| *B29C 70/44* | (2006.01) |
| *B65H 81/00* | (2006.01) |
| *C08J 3/24* | (2006.01) |
| *C08J 5/08* | (2006.01) |
| *B29K 75/00* | (2006.01) |
| *B29K 105/08* | (2006.01) |
| *B29K 105/12* | (2006.01) |
| *B29K 309/08* | (2006.01) |

(52) U.S. Cl.
CPC ............................ *C08J 5/06* (2013.01); *B05D 1/02* (2013.01); *B29C 45/0001* (2013.01); *B29C 45/0013* (2013.01); *B29C 45/02* (2013.01); *B29C 47/0004* (2013.01); *B29C 47/0014* (2013.01); *B29C 47/0057* (2013.01); *B29C 70/443* (2013.01); *B65H 81/00* (2013.01); *C08J 3/242* (2013.01); *C08J 5/08* (2013.01); *C08K 7/02* (2013.01); *C08K 9/04* (2013.01); *B29K 2075/00* (2013.01); *B29K 2105/08* (2013.01); *B29K 2105/12* (2013.01); *B29K 2309/08* (2013.01); *C08J 2375/04* (2013.01); *C08J 2375/06* (2013.01); *C08J 2375/08* (2013.01)

(58) Field of Classification Search
CPC ................. C08K 7/02; C08K 9/04; C08J 5/06
See application file for complete search history.

(56) References Cited

U.S. PATENT DOCUMENTS

| | | | |
|---|---|---|---|
| 3,390,037 A | 6/1968 | Christie | |
| 4,131,149 A * | 12/1978 | Roberts, Jr. ............ | B29D 30/72 152/452 |
| 4,254,010 A * | 3/1981 | Mizuno .............. | C08G 18/4213 523/213 |
| 2003/0078360 A1 | 4/2003 | Hoffmann et al. | |
| 2004/0195731 A1 | 10/2004 | Rische et al. | |
| 2004/0198944 A1* | 10/2004 | Meltzer .............. | C08G 18/0895 528/80 |

FOREIGN PATENT DOCUMENTS

| | | |
|---|---|---|
| EP | 0 111 122 A1 | 6/1984 |
| JP | 61190516 A | 8/1986 |

OTHER PUBLICATIONS

Machine translation of EP 0 111 122 A1, dated Jun. 20, 1984.*
Fuest, Ronald W., Polyurethane Elastomers, "Rubber Technology: Compounding and Testing for Performance," Jul. 1, 2001, Chapter 9, 1st Edition, Hanser Gardner Publications.

* cited by examiner

*Primary Examiner* — Vickey Nerangis
(74) *Attorney, Agent, or Firm* — Robert D. Touslee

(57) ABSTRACT

Methods of making a fiber-reinforced thermoplastic polyurethane composite are described. The methods may include applying a sizing composition to a plurality of fibers to make sized fibers, where the sizing composition may include at least one curative for a thermoplastic polyurethane prepolymer. The sized fibers may be contacted with a thermoplastic polyurethane prepolymer composition to form a resin-fiber amalgam, where the thermoplastic polyurethane prepolymer composition includes 50 wt. % or less of a total amount of the curative that is also present on the sized fibers. The resin-fiber amalgam may then be cured to form the fiber-reinforced thermoplastic polyurethane composite.

18 Claims, 3 Drawing Sheets

FIBER REINFORCED THERMOPLASTIC COMPOSITES AND METHODS OF MAKING

CROSS REFERENCE TO RELATED APPLICATION

This patent application is a division of pending U.S. patent application Ser. No. 14/172,942, filed Feb. 5, 2014.

BACKGROUND OF THE INVENTION

Thermoplastic resins are commonly combined with fibers, particles, and other solids to make reinforced composites. The solids in the composite can increase tensile strength, dimensional stability, and other physical and mechanical characteristics of the articles made with the composites. For example, glass fibers may be combined with a thermoplastic resin composition to produce a glass fiber-reinforced composite (GFRC) with high tensile strength and improved rigidity. The glass fibers may take various forms, such as continuous or chopped strands, rovings, woven or non-woven fabrics, and continuous or chopped strand mats.

The thermoplastic resin composition and glass fibers may be supplied by a extruder to a compression- or injection-molding machine so that they can be formed into the GFRC. Typically, resin pellets and fiberglass are fed together or separately into the extruder. During the extrusion process using single or twin-screw machines, the resin is melted and the fibers are dispersed throughout the molten thermoplastic resin to form a fiber/resin mixture. Next, the fiber/resin mixture may be degassed, cooled, and formed into pellets. The dry fiber strand/resin dispersion pellets may then be had to a molding machine and formed into molded composite articles that have a substantially homogeneous dispersion of glass fibers throughout the composite article.

One difficulty with combining the thermoplastic resin composition and the fibers is the typically high viscosity of the melted resin composition. In many instances, thermoplastic polymers heated to a melting temperature have a viscosity well above room temperature water, more akin to a carbohydrate syrup such as room temperature molasses. Increasing the temperature of melted thermoplastic resin further can reduce the viscosity, but also increases the risk the resin will thermally decompose.

Thus, there is a need for developing methods of making fiber-reinforced thermoplastic composites that permits a thermoplastic resin composition to be combined with fibers at lower viscosity. There is also a need for methods of reducing the viscosity of the thermoplastic resin composition without heating a polymerized thermoplastic resin to its decomposition temperature. The present application addresses this and other challenges in making reinforced thermoplastic composites.

BRIEF SUMMARY OF THE INVENTION

Methods of making fiber-reinforced composites are described where a low viscosity pre-polymerized thermoplastic resin is used to form a resin/fiber mixture and at least one curative for the pre-polymerized thermoplastic resin is provided on sized fibers used in the composite. The curative on the fibers facilitate the polymerization of a low viscosity pre-polymerized thermoplastic resin that forms the polymer matrix of the composite. Exemplary curatives may include polyfunctional (i.e., difunctional, trifunctional, etc.) compounds that form covalent bonds with the prepolymers and developing polymers of a thermoplastic polyurethane resin composition. The present methods allow the partial (and in some instances complete) removal of a curative from the pre-polymerized thermoplastic resin composition introduced to the sized fibers during the making of the fiber-reinforced composite. The reduction or removal of the curative (or curatives) from the thermoplastic resin composition provides it a longer pot life and/or higher processing temperature.

Also described are fiber-reinforced composites that are made with sized fibers that contain at least one curative. Exemplary sized fibers may include glass fibers that are first mixed with a sizing composition that include the curative. The sizing composition can leave the surfaces of the sized fibers with some or all of the curative needed to facilitate the completion of the polymerization of a thermoplastic resin composition that makes contact with the fibers. In some examples, more than one type of curative may be provided on the sized fibers and at the same time reduced or removed from the thermoplastic resin composition.

The removal of a curative from the thermoplastic resin composition can significantly increase the pot life of the resin composition. While the curative is desirably designed to facilitate the polymerization of the thermoplastic resin composition under raised-temperature curing conditions, it can often further polymerization even under more mild conditions when the resin composition is mixed with the fibers. If the polymerization occurs to a great extent, the resin composition becomes too viscous to mix properly with the fibers and often has to be discarded. For the purposes of the present Application, the pot life is measured from the time all the components have been added to the thermoplastic resin composition to the time the resin composition becomes too viscous to properly mix with the fibers.

Embodiments of the present methods may include methods of making a fiber-reinforced polyurethane composite by applying a sizing composition to a plurality of fibers to make sized fibers, where the sizing composition may include at least one curative for a thermoplastic polyurethane prepolymer. The sized fibers may be contacted with a thermoplastic polyurethane prepolymer composition to form a resin-fiber amalgam, where the resin composition includes 50 wt. % or less of a total amount of the curative that is also present on the sized fibers. The resin-fiber amalgam may then be cured to form the fiber-reinforced polyurethane composite.

Embodiments of the invention also include methods of extending a shelf-life of a thermoplastic polyurethane prepolymer composition used to make a fiber-reinforced polyurethane composite. The methods may include applying a sizing composition to a plurality of fibers to make sized fibers, where the sizing composition comprises at least one curative for a thermoplastic polyurethane prepolymer. The methods may further include contacting the sized fibers with the thermoplastic polyurethane prepolymer composition to form a resin-fiber amalgam, and curing the resin-fiber amalgam to form the fiber-reinforced composite. The thermoplastic polyurethane prepolymer composition has at least twice the shelf-life of a resin mixture comprising the thermoplastic polyurethane prepolymer composition mixed with all the curative.

Embodiments of the invention further include fiber-reinforced polyurethane composites made from sized fibers. The sized fibers are made by contacting a plurality of fibers with a sizing composition that includes at least one curative for a thermoplastic polyurethane prepolymer. The fiber-reinforced composites also include a thermoplastic matrix formed from a thermoplastic polyurethane prepolymer composition that lacked at the at least one curative.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

The present methods include combining thermoplastic resin composition with fibers sized with a sizing composition that includes at least one curative for the thermoplastic resin composition. The placement of some or all of the curative on the sized fibers permits lower concentrations of these components in the thermoplastic resin composition. The lower concentration, or in some instances the absence, of the curative components in the thermoplastic resin composition increases its pot-life. The low curative concentrations may also permit lowering the resin composition's viscosity by heating it to higher temperatures without premature polymerization.

Figure 1:
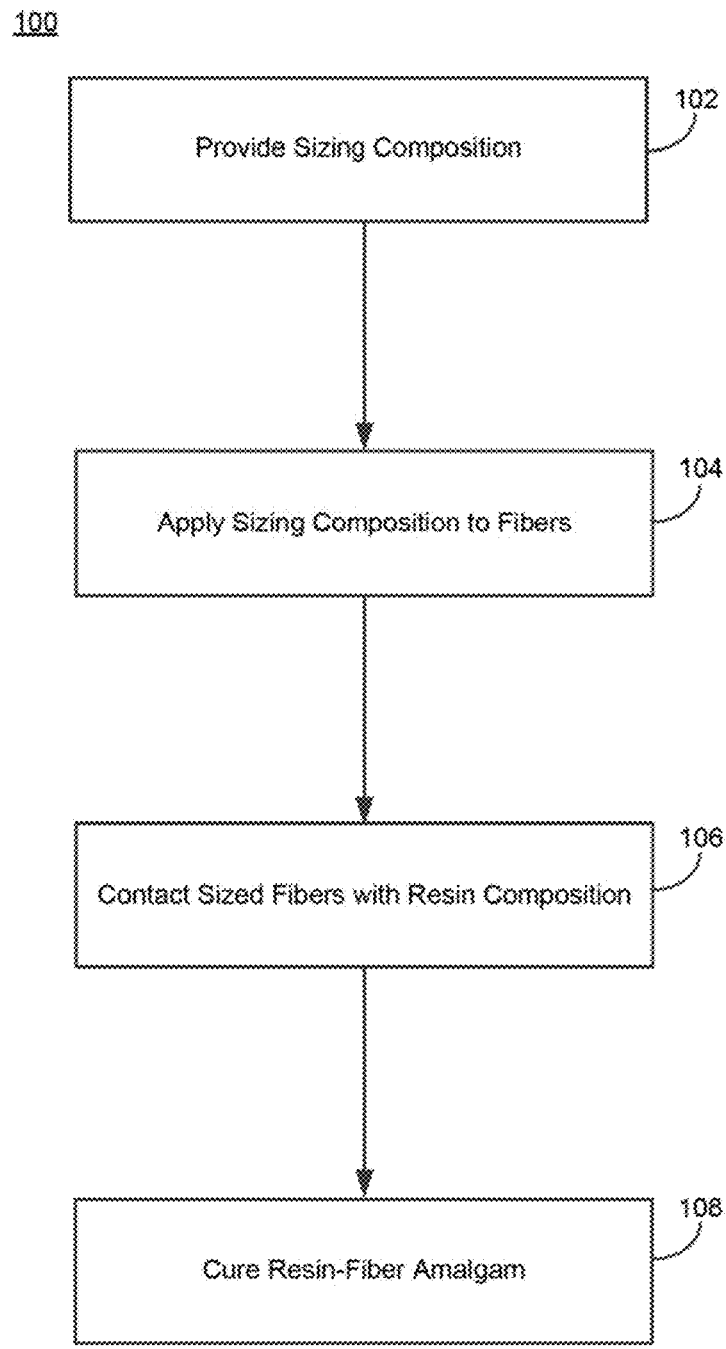
FIG. 1 shows selected steps in a method of making a fiber-reinforced composite according to embodiments of the invention.

FIG. 1 shows selected steps in methods 100 of making a fiber-reinforced composite according to present methods. The methods 100 may include providing a sizing composition 102 that has at least one curative for the thermoplastic resin composition used in the fiber-reinforced composite. The curative present in the sizing composition varies depending on the thermoplastic resin. For example, when the thermoplastic resin composition includes a thermoplastic polyurethane prepolymer, the curative is selected to help polymerize the thermoplastic polyurethane (TPU) prepolymer under polymerization conditions. The curative reacts with reactive moieties on the polyurethane prepolymers (e.g. isocyanate moieties) to become part of the final thermoplastic polymer structure of the fiber-reinforced composite. The curative is polyfunctional and capable of bonding with more than one reactive site of the polyurethane prepolymer. The bonding reactions between the curative and the polyurethane prepolymers can form block copolymers alternating between shorter and more polar "hard" segments and longer, less ordered, and more non-polar "soft" segments. The differences in chemical polarity can cause a phase separation of the hard and soft segments, and also create electrostatic attraction between the hard segments that may increase the elasticity of the polymer.

Exemplary curatives for a thermoplastic resin composition may include amines, organic acids, organic anhydrides, alcohols, and thiols, among other curatives. When the thermoplastic resin composition includes a thermoplastic polyurethane prepolymer, exemplary thermoplastic polyurethane prepolymer curatives may include diamines that form urea bonds with the isocyanate groups on the prepolymer, diols that form urethane bonds with the isocyanate groups on the prepolymer, and hydroxy amines that have both amine and hydroxy functional groups that bond with the prepolymer. They may also include polyfunctional curatives such as polyols (e.g., triols), polyamines (e.g., triamines), and trialkanol amines, among others, that may provide limited covalent crosslinking of the thermoplastic polyurethane in the fiber-reinforced composite. More generally, they may include a compound having the formula $(X)_n$—R—$(Y)_m$, wherein X and Y are independently a hydroxyl group, or an amine group; n and m are independently an integer ranging from 1 to 3; and R is an organic group with one or more carbon atoms.

Specific exemplary diamines may include ethylene diamine, 1,2-diaminopropane, 1,3-diaminopropane, and 2,5-diaminotoluene among other diamines. Specific exemplary diols may include ethylene glycol, propylene glycol, dipropylene glycol, 1,4-butanediol, 1,6-hexanediol, cyclohexane dimethanol, and hydroquinone bis(hydroxyethyl) ether (HQEE), among other diols. Specific exemplary hydroxy amines may include ethanol amine, and 1-amino-2-propanol, among others.

Exemplary curatives for thermoplastic polyurethane prepolymers may also include modified amines that contain at least one amine group and at least one other functional group capable of reacting with the thermoplastic polyurethane prepolymer, such as a hydroxyl group (—OH), carboxyl group (—COOH), amide group (—C(=O)NH—), and/or an anhydride group, among other groups. Exemplary curatives may also include modified alcohols that contain at least one hydroxyl group and at least one other functional group capable of reacting with the thermoplastic polyurethane prepolymer, such as an amine group, carboxyl group (—COOH), amide group (—C(=O)NH—), and/or an anhydride group, among other groups.

Exemplary polyfunctional curatives may have three or more functional moieties capable of reacting with the thermoplastic polyurethane prepolymer. They may include glycerol, sorbitol, and sucrose, among others.

The sizing composition may also include additional compounds beyond the curative for the thermoplastic resin composition. For example, the sizing composition may include a solvent (e.g., water, ethyl alcohol), coupling agents, film-forming agents, lubricants, and wetting agent, among other compounds. The coupling agents may act as chemical linking agents by bonding to both the glass fiber and the plastic matrix. Exemplary coupling agents may include silanes containing organosilane groups that may be coupling agents for glass fibers and organic polymers, and serve to bond the two materials in the composite article.

In some examples, the coupling agent is a reactive coupling agent that may include a functional group that can form a covalent linking bond with the thermoplastic resin composite. For example, the coupling agent may have an amino silane group or a hydroxyl silane group. The amine and hydroxyl functional groups on the silane coupling compound can react to form covalent urea and urethane linkages, respectively, with a thermoplastic polyurethane prepolymer.

Film forming agents may provide a desired degree of bonding between the fibers in the fiber strands to avoid fuzzing and excess filamentation during processing in fiber manufacturing operations and/or fiber composite fabrication operations. Lubricants help protect the surface of the fibers from scratches and abrasions commonly caused by fiber-to-fiber contact and friction during processing. Wetting agents facilitate the spread of the sizing composition on the surface of the fibers, and may also facilitate the spread of the thermoplastic resin composition across the surface of the sized fibers.

Returning to FIG. 1, the above-described sizing composition may be applied to the fibers 104. The application of the sizing composition to the fibers may be achieved by kiss-roll coating, spraying, dipping, contacting, and/or mixing the liquid sizing composition and the fibers. The wet sized fibers may be exposed to elevated temperature and/or turbulent flow conditions to accelerate their drying.

Exemplary fibers used in the present sizing applications may include one or more types of fibers chosen from glass fibers, ceramic fibers, carbon fibers, metal fibers, and organic polymer fibers, among other kinds of fibers. Exemplary glass fibers may include "E-glass", "A-glass", "C-glass", "S-glass", "ECR-glass" (corrosion resistant glass), "T-glass", and fluorine and/or boron-free derivatives thereof. Exemplary ceramic fibers may include aluminum oxide, silicon carbide, silicon nitride, silicon carbide, and basalt fibers, among others. Exemplary carbon fibers may include graphite, semi-crystalline carbon, and carbon nano tubes, among other types of carbon fibers. Exemplary metal fibers may include aluminum, steel, and tungsten, among other types of metal fibers. Exemplary organic polymer fibers may include poly aramid fibers, polyester fibers, and polyamide fibers, among other types of organic polymer fibers.

The fiber length may range from short-to-intermediate chopped fibers (e.g., about 0.5 inches or less in length) to long fibers (e.g., more than about 0.5 inches in length), and to continuous fibers and rovings, among others. In addition to imparting reactive curing properties to the fibers, the sizing composition may enhance the fibers' physical characteristics in a number of ways including increased hardness, increased mechanical strength, greater wettability, and increased adhesion between the fibers and resin.

Once the fibers are sized, they may then be contacted with the thermoplastic resin composition to make a fiber-resin amalgam 106. As noted above, one exemplary thermoplastic resin composition is a thermoplastic polyurethane (TPU) prepolymer. Exemplary TPU prepolymers may include reactive isocyanate groups that can react with the curative to form a thermoplastic polyurethane polymer. In the present embodiments, the thermoplastic polyurethane polymer forms the polymer matrix of a fiber-reinforced composite.

Figure 2A:
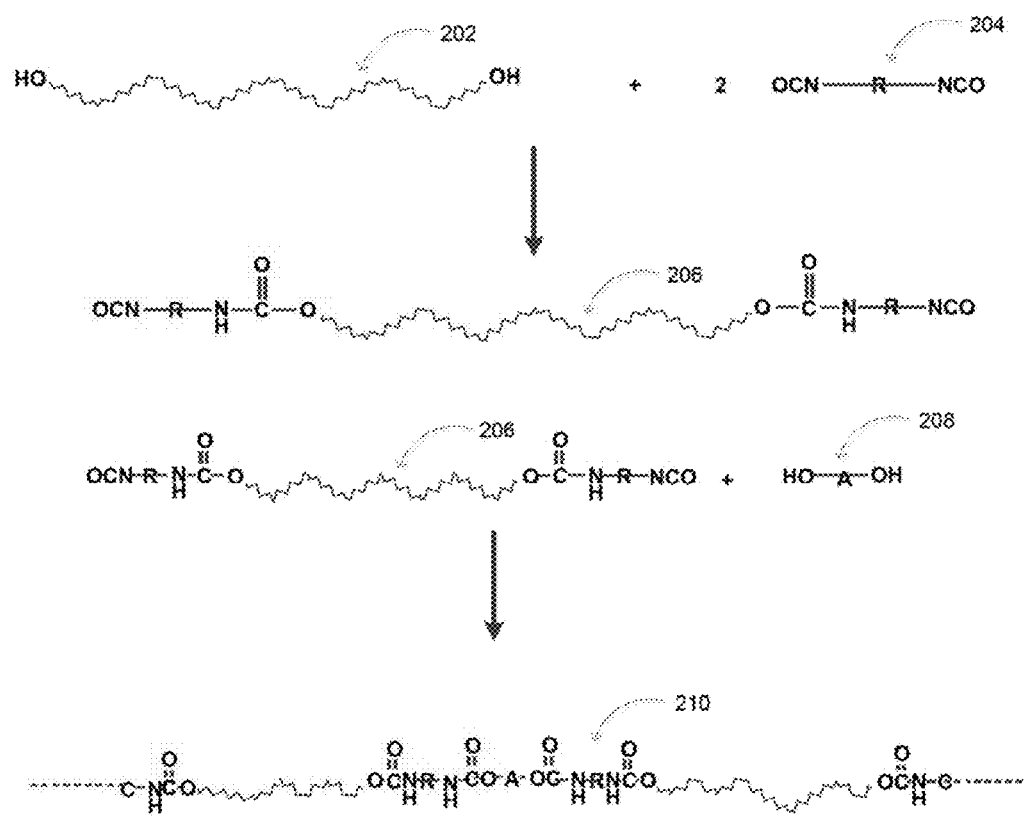
FIG. 2A shows a simplified reaction scheme for the formation of TPU prepolymers and their reaction with a curative to form a TPU polymer.

Referring now to FIG. 2A, the thermoplastic polyurethane (TPU) prepolymers 206 may be formed from the reaction of a diisocyanate compound 204 with a polyol compound 202. Exemplary diisocyanate compounds may include alkyl diisocyanates such as hexamethylene diisocyanate, and aryl diisocyanates such as toluene diisocyanate and methylene diphenyl diisocyanate, among others. Exemplary polyols may include long-chain polyols such as polyether-type polyols and polyester-type polyols. Exemplary polyether-type polyols may include polyethylene glycol, polypropylene glycol, poly(tetramethylene ether) glycol, and tetrahydrofuran ethers, among others. Exemplary polyester-type polyols may include polyol products from the reaction between adipic acid (AA) and diethylene glycol. FIG. 2A shows an exemplary curative 208 that includes a diol with two reactive hydroxyl group (—OH) as functional groups. It should be appreciated that the exemplary curative 208 is one of many types of curatives described above that can be used in the present methods.

In the reaction schematic illustrated in FIG. 2A, the polyol 202 and the diisocyanate compound 204 react to form a TPU prepolymer 206, and then the TPU prepolymer 206 reacts with the curative 208 to form the thermoplastic polyurethane (TPU) polymer 210. The TPU polymer 210 includes a hard segment made of adjacent diisocyanate groups that are covalently linked by curative, and soft segments made of long chains in the reacted polyol. It should be appreciated that the TPU polymer 210 shown may be a portion of a larger TPU polymer.

Figure 2B:
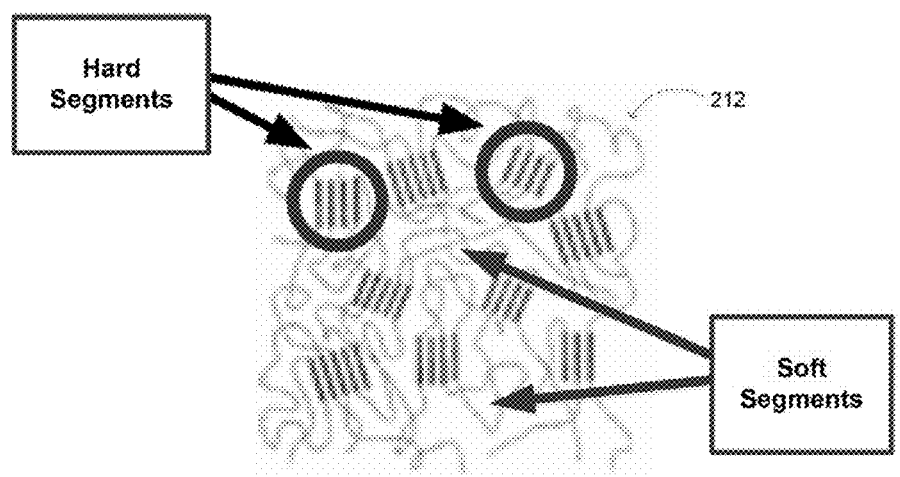
FIG. 2B shows a portion of a TPU polymer.

FIG. 2B shows a larger portion of a TPU polymer 212, that includes a first phase of physically bonded hard segments incorporated into a second phase of soft segments. The physically bonded hard segments provide a physical crosslinking that imparts an elastomeric quality to the TPU polymer 212. Unlike the permanent chemical crosslinking found in elastomic polymers like thermoset rubber, the physical crosslinking of the hard segments is reversible with the application of sufficient heat.

The thermoplastic resin composition may include the at least one curative that is added to the resin composition prior to contact with the sized fibers. When the sized fibers include a curative for the thermoplastic resin composition, a lower concentration of curative is required in the resin composition to complete the polymerization. For example, sized fibers that include a curative may contact a thermoplastic resin composition having 50 wt. % or less of the curative in the resin composition. For example the resin composition may have 50 wt. % or less, 40 wt. % or less, 30 wt. % or less, 25 wt. % or less, 20 wt. % or less, 15 wt. % or less, 10 wt. % or less, 5 wt. % or less, etc., of the total amount of curative while the remainder is supplied by the sized fibers. In some embodiments, all the curative may be provided by the sized fibers and there is no curative present in the resin composition.

Exemplary weight percentage distribution ratios for the curative in the thermoplastic resin composition and the sized fibers may be 50:50 [resin:fibers], 40:60, 30:70, 20:80, 15:85, 10:90, 5:95, and 0:100. These exemplary weight percentage distribution ratios also include ranges, including 50:50 to 40:60, 40:60 to 30:70, 30:70 to 20:80, 20:80 to 15:85, 15:85 to 10:90, 10:90 to 5:95, and 5:95 to 0:100. They may also be extended across two or more of the above-described ranges, for example 50:50 to 30:70, 50:50 to 0:100, 40:60 to 10:90, and so forth.

In embodiments where two or more curatives are used, they may be reduced independently or collectively in the thermoplastic resin composition by the above-describe amounts and distribution ratios for a single curative. In further embodiments where two or more curatives are used, the combined amount of the curatives in the resin composition may be 50 wt. % or less, 40 wt. % or less, 30 wt. % or less, 25 wt. % or less, 20 wt. % or less, 15 wt. % or less, 10 wt. % or less, 5 wt. % or less, etc., of the total amount of the curatives, while the remainder is supplied by the sized fibers. For example, the combined amount of the curatives in the resin composition may be 50 wt. %. As noted above, the combined amounts of curatives may have the above-described weight percentage distribution ratios for the example with a single curative.

The combination of the sized fibers and thermoplastic resin composition to make the fiber-resin amalgam may be achieved by thermoplastic composite manufacturing techniques, including resin-injection molding (RIM), structural resin-injection molding (SRIM), resin transfer molding (RTM), vacuum infusion, wet lay-up processes, spray-up processes, filament winding processes, and pultrusion processes, among other processes. In some embodiments, the fiber-resin amalgam may be formed into sheet molding compounds (SMCs) and/or bulk molding compounds (BMCs) that can be used in compression molding techniques to produce the fiber-reinforced composite.

Exemplary thermoplastic composite manufacturing techniques may also include direct-long fiber thermoplastic (D-LFT) molding techniques. D-LFT molding is a technology where thermoplastic resin composition is directly compounded with long glass fibers and then molded in one operation. Different from a conventional extrusion process in which chopped fibers are used, in a D-LFT process continuous roving strands are fed into extruder. The advantage of D-LFT is the ability to produce significantly longer glass fibers in the final composite materials. In comparison to a standard LFT process based on long fiber pellets, the D-LFT process doesn't produce semi-finished material. When D-LFT is used in compression or injection molding, a melted resin-fiber composition may be transferred into a molding tool located in a compression press or directly injected into the mold.

Exemplary thermoplastic composite manufacturing techniques may further include long fiber injection (LFI) molding techniques. In LFI techniques for thermoplastic polyurethane fiber-reinforced composites, chopped fiber and polyurethane components are combined and delivered to a mold cavity in a continuous process. The LFI system may include a mixing head with fiber cutting units to chop glass fibers to a specified length. In some embodiments, polyol and diisocyanate that make up the polyurethane may also be delivered to the mixing head, while in others the thermoplastic polyurethane prepolymer may be delivered. In either case, the polyurethane composition is combined with the chopped glass fibers in the mixing head. The mixing head may be passed over a mold as the fiber-composition combination from the mixing head is poured into the mold, which may be heated. When the addition of the fiber-composition combination is complete, the mold may be closed and pressure may be applied. After a curing time has passed (e.g. about 2 to 10 minutes), the fiber-reinforced composite article may be removed from the mold. When the present combinations of thermoplastic polyurethane prepolymer compositions and curative-containing sized fibers are used, there is lower viscosity and less polymerization of the prepolymer composition in the mixing head, resulting in less frequent cleaning, maintenance, and other downtime for the LFI system.

Accompanying or following the formation of the fiber-resin amalgam, the thermoplastic resin composition may be polymerized to form the fiber-reinforced composite 108. The polymerization conditions may include elevating the temperature of the fiber-resin amalgam above a polymerization-threshold temperature. The exemplary thermoplastic polyurethane resin systems may have a polymerization-threshold temperature ranging from room temperature (e.g., about 20° C.) to about 180° C. (e.g., 100° C. to 150° C.).

Figure 3:
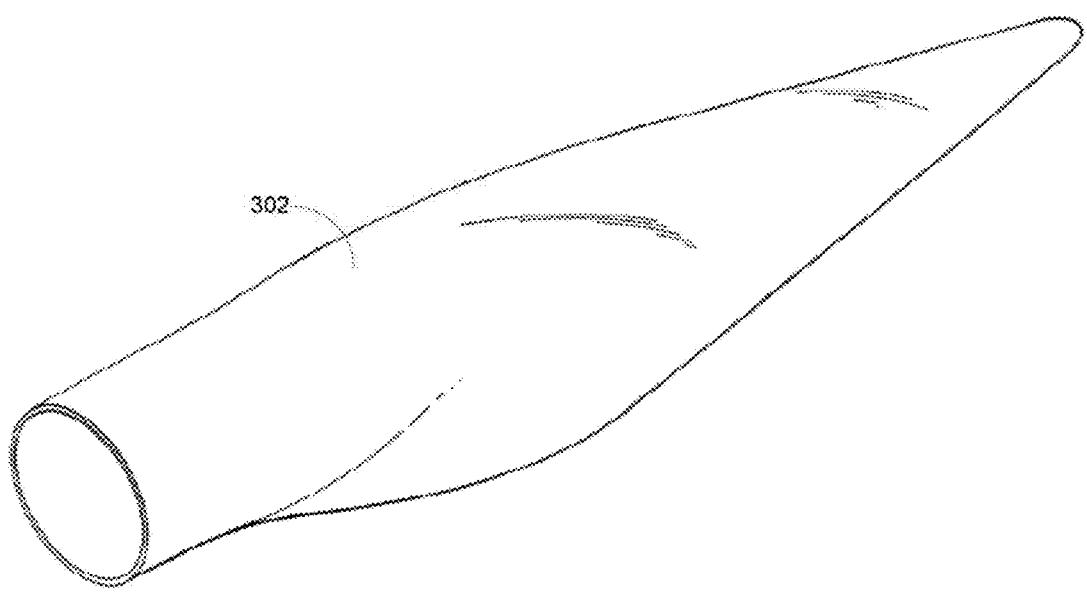
FIG. 3 shows exemplary fiber-reinforced composites made with the present thermoplastic resin compositions and sized fiber combinations.

FIG. 3 shows an exemplary fiber-reinforced composite wind turbine blade 302 formed by the present fiber-resin amalgams. The blade 302 is one of many types of articles that can be formed by the amalgams. Other articles may include vehicle parts (e.g., aircraft parts, automotive parts, etc.), appliance parts, containers, etc.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the fiber" includes reference to one or more fibers and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A fiber-reinforced thermoplastic polyurethane composite comprising:
    sized fibers that have been formed from a plurality of fibers contacted with a sizing composition that has at least one curative and at least one silane coupling agent having (i) a fiber coupling group that forms a bond with the fibers, and (ii) a separate hydroxyl functional group that forms a covalent urethane linkage with a thermoplastic polyurethane matrix;
    wherein the thermoplastic polyurethane matrix was formed from a thermoplastic polyurethane prepolymer composition that included 50 wt. % or less of a total amount of the at least one curative present on the sized fibers, and
    wherein the plurality of fibers were contacted with the sizing composition before the thermoplastic polyurethane prepolymer composition contacts the sized fibers.

2. The fiber-reinforced thermoplastic polyurethane composite of claim 1, wherein the thermoplastic polyurethane prepolymer composition included 30 wt. % or less of the total amount of the at least one curative present on the sized fibers.

3. The fiber-reinforced thermoplastic polyurethane composite of claim 1, wherein the thermoplastic polyurethane prepolymer composition included 10 wt. % or less of the total amount of the at least one curative present on the sized fibers.

4. The fiber-reinforced thermoplastic polyurethane composite of claim 1, wherein the thermoplastic polyurethane prepolymer composition lacked any of the at least one curative present on the sized fibers.

5. The fiber-reinforced thermoplastic polyurethane composite of claim 1, wherein the thermoplastic polyurethane prepolymer composition is the reaction product of a polyol and a polyisocyanate compound.

6. The fiber-reinforced thermoplastic polyurethane composite of claim 5, wherein the polyol comprises a polyester polyol or a polyether polyol.

7. The fiber-reinforced thermoplastic polyurethane composite of claim 6, wherein the polyester polyol comprises a reaction product of adipic acid and diethylene glycol.

8. The fiber-reinforced thermoplastic polyurethane composite of claim 6, wherein the polyether polyol comprises a polyalkylene glycol.

9. The fiber-reinforced thermoplastic polyurethane composite of claim 1, wherein the fiber-reinforced polyurethane composite comprises two or more curatives.

10. The fiber-reinforced thermoplastic polyurethane composite of claim 1, wherein the sizing composition comprises at least one thermoplastic polyurethane prepolymer curative.

11. The fiber-reinforced thermoplastic polyurethane composite of claim 10, wherein the thermoplastic polyurethane prepolymer curative comprises a compound having the formula $(X)_n$—R—$(Y)_m$, wherein X and Y are independently a hydroxyl group or an amine group;

n and m are independently an integer ranging from 1 to 3; and

R is an organic group with one or more carbon atoms.

12. The fiber-reinforced thermoplastic polyurethane composite of claim 10, wherein the thermoplastic polyurethane prepolymer curative comprises diamines, diols, or hydroxy amines.

13. The fiber-reinforced thermoplastic polyurethane composite of claim 12, wherein the diamines are selected from the group consisting of ethylene diamine, 1,2-diaminiopropane, 1,3-diaminopropane, and 2,5-diaminotoluene.

14. The fiber-reinforced thermoplastic polyurethane composite of claim 12, wherein the diols are selected from the group consisting of ethylene glycol, propylene glycol, dipropylene glycol, 1,4-butanediol, 1,6-hexanediol, cyclohexane dimethanol, and hydroquinone bis(hydroxyethyl) ether.

15. The fiber-reinforced thermoplastic polyurethane composite of claim 12, wherein the hydroxy amines are selected from the group consisting of ethanol amine, and 1-amino-2-propanol.

16. The fiber-reinforced thermoplastic polyurethane composite of claim 1, wherein the plurality of fibers are selected from the group consisting of glass fibers, ceramic fibers, carbon fibers, metal fibers, and organic polymer fibers.

17. The fiber-reinforced thermoplastic polyurethane composite of claim 1, wherein the plurality of fibers are glass fibers.

18. The fiber-reinforced thermoplastic polyurethane composite of claim 1, wherein the plurality of fibers may include one or more type of fibers selected from the group consisting of chopped fibers, continuous fibers, and rovings.

* * * * *